United States Patent
Ackermann et al.

(10) Patent No.: US 8,308,504 B2
(45) Date of Patent: Nov. 13, 2012

(54) CONNECTING DEVICE FOR CONNECTION TO A SOLAR MODULE AND SOLAR MODULE WITH SUCH A CONNECTING DEVICE

(75) Inventors: Gerhard Ackermann, Altlussheim (DE); Manfred Schaarschmidt, Lautertal (DE)

(73) Assignee: Tyco Electronics AMP GmbH, Bensheim (DE)

( * ) Notice: Subject to any disclaimer, the term of this patent is extended or adjusted under 35 U.S.C. 154(b) by 0 days.

(21) Appl. No.: 13/133,910

(22) PCT Filed: Dec. 2, 2009

(86) PCT No.: PCT/EP2009/066232
§ 371 (c)(1),
(2), (4) Date: Jun. 9, 2011

(87) PCT Pub. No.: WO2010/066619
PCT Pub. Date: Jun. 17, 2010

(65) Prior Publication Data
US 2011/0269347 A1 Nov. 3, 2011

(30) Foreign Application Priority Data
Dec. 12, 2008 (DE) .......................... 10 2008 062 034

(51) Int. Cl.
*H01R 12/24* (2006.01)
(52) U.S. Cl. .................... 439/496; 439/620.21
(58) Field of Classification Search .................. 439/626, 439/496, 620.21; 174/59
See application file for complete search history.

(56) References Cited

U.S. PATENT DOCUMENTS

| | | | |
|---|---|---|---|
| 4,310,211 A * | 1/1982 | Bunnell et al. | 439/358 |
| 4,460,232 A * | 7/1984 | Sotolongo | 439/535 |
| 5,280,133 A * | 1/1994 | Nath | 174/373 |
| 6,166,321 A * | 12/2000 | Sasaoka et al. | 136/251 |
| 6,344,612 B1 * | 2/2002 | Kuwahara et al. | 174/50 |

(Continued)

FOREIGN PATENT DOCUMENTS
DE 10358140 A1 9/2005
(Continued)

OTHER PUBLICATIONS

International Preliminary Report on Patentability, dated Jun. 14, 2011, issued by the International Bureau of WIPO, Geneva, Switzerland, for PCT/EP2009/066232; 6 pages.

(Continued)

*Primary Examiner* — Ross Gushi
(74) *Attorney, Agent, or Firm* — Faegre Baker Daniels LLP

(57) ABSTRACT

A connecting device for connection to an electrical connection system of a solar module comprises a connector housing for arranging on an outer face of the solar module and current-carrying components arranged in the connector housing, which components comprise at least one contact for connection to a conductor of the electrical connection system of the solar module, which conductor leads out from the solar module. A connection device, which may be arranged inside the connector housing, for positioning the conductor which leads out from the solar module is also provided, it being possible for the connection device and the contact to be arranged relative to one another in such a way that the contact is initially guided contactlessly along the conductor which leads out, so as to contact said conductor which leads out, and contacts the conductor which leads out in an end position. Reliable contact is thus possible without displacing the conductor which leads out.

15 Claims, 3 Drawing Sheets

U.S. PATENT DOCUMENTS

Figure 1:
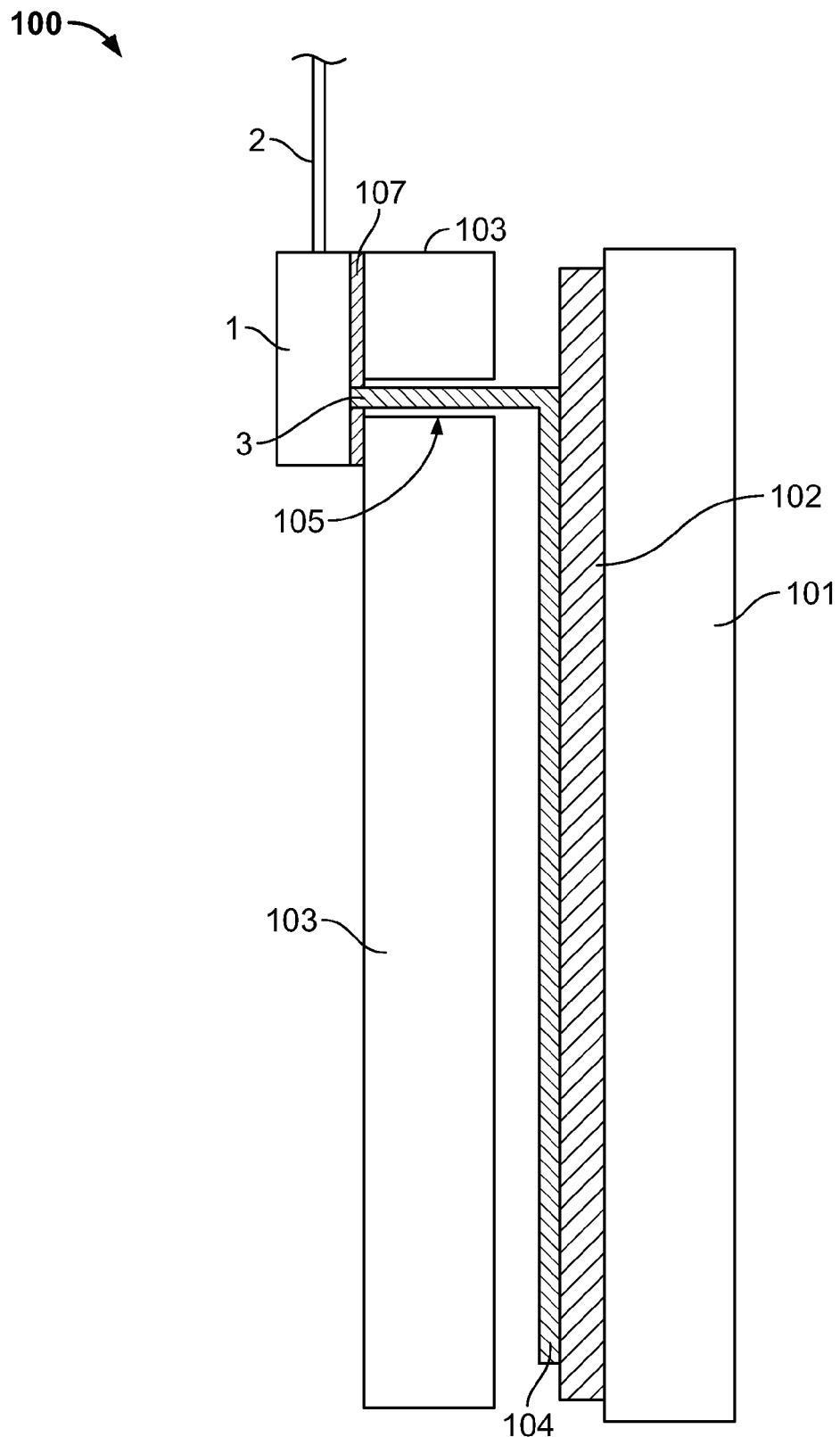

| Patent No. | Date | Inventor | Class |
|---|---|---|---|
| 6,369,315 B1* | 4/2002 | Mizukami et al. | 136/244 |
| 6,582,249 B1* | 6/2003 | Boeck et al. | 439/492 |
| 6,655,987 B2* | 12/2003 | Higashikozono et al. | 439/535 |
| 6,828,503 B2* | 12/2004 | Yoshikawa et al. | 174/50 |
| 7,097,516 B2* | 8/2006 | Werner et al. | 439/709 |
| 7,134,883 B2* | 11/2006 | Werner et al. | 439/76.1 |
| 7,282,635 B2* | 10/2007 | Utsunomiya et al. | 136/244 |
| 7,291,036 B1* | 11/2007 | Daily et al. | 439/487 |
| 7,365,965 B2* | 4/2008 | Higashikozono et al. | 361/641 |
| 7,369,398 B2* | 5/2008 | Higashikozono et al. | 361/641 |
| 7,387,537 B1* | 6/2008 | Daily et al. | 439/620.22 |
| 7,444,743 B2* | 11/2008 | Feldmeier et al. | 29/748 |
| 7,481,669 B1* | 1/2009 | Lee | 439/496 |
| 7,530,837 B2* | 5/2009 | Nieleck et al. | 439/441 |
| 7,591,690 B1* | 9/2009 | Chien et al. | 439/709 |
| 7,618,265 B2* | 11/2009 | Rueggen et al. | 439/76.1 |
| 7,632,109 B2* | 12/2009 | Boensch et al. | 439/76.1 |
| 7,648,371 B2* | 1/2010 | Boensch et al. | 439/76.1 |
| 7,655,859 B2* | 2/2010 | Naβ et al. | 136/243 |
| 7,672,116 B2* | 3/2010 | Li et al. | 361/641 |
| 7,705,234 B2* | 4/2010 | Feldmeier et al. | 136/251 |
| 7,723,608 B2* | 5/2010 | Higashikozono et al. | 136/244 |
| 7,723,609 B2* | 5/2010 | Yoshikawa et al. | 136/244 |
| 7,737,355 B2* | 6/2010 | Nieleck et al. | 136/243 |
| 7,763,807 B2* | 7/2010 | Richter | 174/138 F |
| 7,824,189 B1* | 11/2010 | Lauermann et al. | 439/76.1 |
| 7,824,190 B2* | 11/2010 | Beck et al. | 439/76.1 |
| 7,833,033 B2* | 11/2010 | McMahon et al. | 439/212 |
| 7,880,098 B2* | 2/2011 | Grimberg et al. | 174/547 |
| 7,920,385 B2* | 4/2011 | Yoshikawa et al. | 361/752 |
| 7,927,132 B1* | 4/2011 | Lin | 439/527 |
| 7,928,314 B2* | 4/2011 | Higashikozono et al. | 136/244 |
| 7,928,315 B2* | 4/2011 | Nagai et al. | 136/244 |
| 7,938,661 B2* | 5/2011 | Good et al. | 439/271 |
| 7,939,754 B2* | 5/2011 | Richter et al. | 174/50 |
| 7,960,650 B2* | 6/2011 | Richter et al. | 174/50 |
| 7,972,177 B2* | 7/2011 | Richter | 439/620.26 |
| 7,988,486 B1* | 8/2011 | Lin | 439/527 |
| 8,003,885 B2* | 8/2011 | Richter et al. | 174/50 |
| 8,033,859 B2* | 10/2011 | Giefers | 439/441 |
| 8,040,678 B2* | 10/2011 | Tai et al. | 361/752 |
| 8,075,326 B2* | 12/2011 | Quiter et al. | 439/224 |
| 8,083,540 B1* | 12/2011 | Spicer et al. | 439/460 |
| 8,097,818 B2* | 1/2012 | Gerull et al. | 174/564 |
| 8,113,853 B2* | 2/2012 | Coyle et al. | 439/76.1 |
| 8,128,439 B2* | 3/2012 | Feldmeier et al. | 439/709 |
| 8,137,115 B1* | 3/2012 | Chou et al. | 439/76.1 |
| 8,152,536 B2* | 4/2012 | Scherer et al. | 439/76.1 |
| 8,162,677 B2* | 4/2012 | Yu et al. | 439/76.2 |
| 8,192,233 B2* | 6/2012 | Duesterhoeft et al. | 439/620.21 |
| 8,197,263 B2* | 6/2012 | Rueggen et al. | 439/76.1 |
| 2003/0034064 A1* | 2/2003 | Hatsukaiwa et al. | 136/251 |
| 2003/0193322 A1* | 10/2003 | Higashikozono et al. | 323/299 |
| 2004/0177587 A1* | 9/2004 | Yoshikawa et al. | 174/59 |
| 2004/0261835 A1* | 12/2004 | Utsunomiya et al. | 136/244 |
| 2005/0022859 A1* | 2/2005 | Nass et al. | 136/251 |
| 2005/0054219 A1* | 3/2005 | Werner et al. | 439/76.1 |
| 2005/0054244 A1* | 3/2005 | Werner et al. | 439/682 |
| 2005/0161080 A1* | 7/2005 | Nieleck et al. | 136/293 |
| 2005/0197001 A1* | 9/2005 | Higashikozono et al. | 439/485 |
| 2005/0230140 A1* | 10/2005 | Higashikozono et al. | 174/59 |
| 2005/0236031 A1* | 10/2005 | Higashikozono et al. | 136/251 |
| 2006/0000504 A1* | 1/2006 | Feldmeier et al. | 136/251 |
| 2006/0049802 A1* | 3/2006 | Higashikozono et al. | 320/134 |
| 2006/0283628 A1* | 12/2006 | Feldmeier et al. | 174/260 |
| 2006/0289053 A1* | 12/2006 | Nieleck et al. | 136/244 |
| 2007/0137689 A1* | 6/2007 | Feldmeier et al. | 136/244 |
| 2008/0110490 A1* | 5/2008 | Duesterhoeft | 136/248 |
| 2008/0190477 A1* | 8/2008 | Hattori | 136/246 |
| 2008/0232040 A1* | 9/2008 | Li et al. | 361/676 |
| 2008/0280509 A1* | 11/2008 | Ma et al. | 439/837 |
| 2009/0209115 A1* | 8/2009 | Rueggen et al. | 439/76.1 |
| 2009/0260676 A1* | 10/2009 | McMahon et al. | 136/251 |
| 2009/0272559 A1* | 11/2009 | Richter et al. | 174/59 |
| 2009/0272574 A1* | 11/2009 | Richter et al. | 174/548 |
| 2009/0275231 A1* | 11/2009 | Richter | 439/535 |
| 2009/0309689 A1* | 12/2009 | Pavlovic et al. | 337/187 |
| 2010/0012343 A1* | 1/2010 | Ji et al. | 174/50.52 |
| 2010/0018572 A1* | 1/2010 | Grimberg et al. | 136/252 |
| 2010/0105245 A1* | 4/2010 | Good et al. | 439/571 |
| 2010/0112851 A1* | 5/2010 | Giefers | 439/535 |
| 2010/0139760 A1* | 6/2010 | Giefers | 136/256 |
| 2010/0173511 A1* | 7/2010 | Giefers | 439/329 |
| 2010/0216336 A1* | 8/2010 | Quiter et al. | 439/567 |
| 2010/0218797 A1* | 9/2010 | Coyle et al. | 136/243 |
| 2010/0218802 A1* | 9/2010 | Quiter | 136/244 |
| 2010/0263714 A1* | 10/2010 | Lauermann et al. | 136/251 |
| 2010/0294529 A1* | 11/2010 | Nunokawa | 174/60 |
| 2011/0058337 A1* | 3/2011 | Han et al. | 361/717 |
| 2011/0073157 A1* | 3/2011 | Suzuki | 136/244 |
| 2011/0073362 A1* | 3/2011 | Shimizu | 174/520 |
| 2011/0092094 A1* | 4/2011 | Rueggen et al. | 439/540.1 |
| 2011/0108085 A1* | 5/2011 | Quiter | 136/244 |
| 2011/0136395 A1* | 6/2011 | Yamazaki | 439/709 |
| 2011/0168228 A1* | 7/2011 | McGreevy et al. | 136/244 |
| 2011/0195585 A1* | 8/2011 | Feldmeier et al. | 439/110 |
| 2011/0198120 A1* | 8/2011 | Richter et al. | 174/548 |
| 2011/0240088 A1* | 10/2011 | Ecob | 136/244 |
| 2011/0269347 A1* | 11/2011 | Ackermann et al. | 439/626 |
| 2011/0290303 A1* | 12/2011 | Weldon et al. | 136/251 |
| 2012/0000689 A1* | 1/2012 | Shu et al. | 174/59 |
| 2012/0033392 A1* | 2/2012 | Golubovic et al. | 361/752 |
| 2012/0043106 A1* | 2/2012 | Richter et al. | 174/53 |
| 2012/0043986 A1* | 2/2012 | Richter et al. | 324/756.01 |
| 2012/0045937 A1* | 2/2012 | Richter et al. | 439/620.21 |
| 2012/0048614 A1* | 3/2012 | Xue et al. | 174/520 |
| 2012/0048615 A1* | 3/2012 | Masumoto | 174/547 |
| 2012/0052719 A1* | 3/2012 | Xue et al. | 439/485 |
| 2012/0067613 A1* | 3/2012 | Yu et al. | 174/59 |
| 2012/0069505 A1* | 3/2012 | Chou et al. | 361/679.01 |
| 2012/0071024 A1* | 3/2012 | Yu et al. | 439/540.1 |
| 2012/0071025 A1* | 3/2012 | Chou et al. | 439/540.1 |
| 2012/0075825 A1* | 3/2012 | Yamazaki | 361/809 |
| 2012/0085565 A1* | 4/2012 | Kleiss et al. | 174/50 |
| 2012/0100731 A1* | 4/2012 | Umemoto et al. | 439/86 |
| 2012/0122343 A1* | 5/2012 | Limberg | 439/620.21 |
| 2012/0125682 A1* | 5/2012 | Lu et al. | 174/548 |

FOREIGN PATENT DOCUMENTS

| | | |
|---|---|---|
| DE | 102005025632 A1 | 12/2006 |
| DE | 102006019210 A1 | 10/2007 |
| EP | 1729369 A2 | 12/2006 |

OTHER PUBLICATIONS

International Search Report issued by the European Patent Office, dated Dec. 29, 2010, for PCT/EP2009/066232, 4 pages.

Search Report issued by the German Patent & Trademark Office, dated Jun. 30, 2009, for Priority Application No. DE 102008062034. 3-55, 4 pages.

* cited by examiner

CONNECTING DEVICE FOR CONNECTION TO A SOLAR MODULE AND SOLAR MODULE WITH SUCH A CONNECTING DEVICE

The present invention relates to a connecting device for connection to an electrical connecting system of a solar module, with a connector housing for arranging on an outer face of the solar module and current-carrying components arranged in the connector housing in accordance with the preamble of claim 1. The invention also relates to a solar module with such a connecting device.

In order to generate electrical energy from sunlight, photovoltaic solar modules are used which convert sunlight directly into electrical energy. Solar modules of this type generally consist of a plurality of individual solar cells which are arranged side by side between a common front cover layer and a common rear cover layer and are interconnected. Furthermore, a connecting device, for example in the form of a junction box, is generally arranged on a solar module, which connecting device is mounted on the rear side of the solar module remote from the sun side. The electrical connecting system of a solar module, in particular the connecting lines which lead out from the solar cells of the solar module, for example in the form of connecting foils, are connected in an electrically conductive manner to corresponding connecting elements in a connecting device of this type. In addition to connecting elements of this type, the connecting device may also comprise further current-carrying components, for example in the form of so-called bypass diodes and plug connector contacts. One or more external connecting cables may be connected to the connecting device by way of said contacts. An electrical connecting system of a solar module can thus be accessed from the outside by way of plug connectors or external cables. Connection is made inside the connector housing to the electrical connecting system of the solar module, for example by way of soldering, screwing or clamping, a connecting foil, for example in the form of a planar strip, thus being led out from the solar module and fed into the connecting device. The connecting foil thus fed into a connecting device is, for example, manually clamped to a conductor rail. Manual contacting of this type of the connecting foils or planar strips during manufacture of a solar module is relatively time-consuming and expensive.

DE 10 2006 019 210 A1 discloses a connection arrangement for solar modules and a method for the production of junction boxes for solar modules. In the connection arrangement disclosed therein, the ends of the contact strips are led outwards through an opening in one of the covering glass plates of the solar module, a junction box being arranged across the opening and comprising at least one tight housing with terminal contacts arranged therein. Said contacts are connected at one end to solar connecting cables and, at the other end, form the connection to the ends of the contact strips of the solar module when the junction box is unreleasably mounted on the glass plate in the region of the opening. In particular, a replaceable component is arranged in the opening in the glass plate of the solar module for guiding, centring and positioning the ends of the contact strips and/or the junction box in such a way that the terminal contacts encompass the ends of the contact strips and contact them repeatedly.

This connection arrangement poses the advantage that it is relatively easy to assemble since it merely consists of comparatively few separate parts and the individual assembly steps can be carried out relatively simply. In particular, the configuration of the replaceable component makes it possible to move the ends of the contact strips, which lead out, around outer webs which are provided on the replaceable component, in such a way that the terminal contacts contact the ends of the contact strips, which lead out, on both sides, a separating web being formed between the contacting webs so the junction box can only be mounted on the glass plate if it is accurately positioned.

One drawback of the aforementioned connection arrangement is that the terminal contacts are guided over the ends of the contact strips, which ends are arranged around a respective web, it being possible to displace the ends of the contact strips until the respective terminal contact is fixed in its end position. This basically results in the respective terminal contact being pulled over the corresponding end of the contact strip, which leads out, in order to produce contact and being moved along the contact strip with the exertion of contact pressure, allowing for the contact strip to move.

The object of the present invention is to provide a connecting device of the aforementioned type, in which the connecting device with a connecting system of a solar module can be positioned and contacted in a relatively simple manner whist also maintaining a high level of reliable contact.

The object is achieved by a connecting device according to the features of claim 1. The invention also relates to a solar module according to the features of claim 15.

The connecting device according to the invention comprises a connector housing for arranging on an outer face of a photovoltaic solar module as well as current-carrying components arranged in the connector housing, which components comprise at least one contact for connection to a conductor of the electrical connection system, which conductor leads out from the solar module. A connection device, which may be arranged inside the connector housing, for positioning the conductor which leads out from the solar module is also provided, it being possible for the connection device and the contact to be arranged relative to one another in such a way that the contact is moved, at least in part, along the conductor which leads out so as to contact said conductor which leads out. The connection device comprises a guide means which is configured in such a way that the contact is initially guided contactlessly along the conductor which leads out, so as to contact said conductor which leads out, and contacts the conductor which leads out in an end position.

The invention thus poses the advantage that the contact, for example in the form of a contact spring, only contacts the conductor which leads out from the solar module once the contact has reached its end position. This is ensured by the guide means which initially guides the contact contactlessly along the conductor which leads out during the course of contacting said conductor which leads out and also ensures that the contact contacts the conductor which leads out when in its end position. In accordance with the invention, the conductor which leads out from the solar module is thus prevented from being moved during the course of contacting a contact of the connecting device. The idea according to the invention has proven to be advantageous, in particular, when the conductor which leads out is configured as a connecting foil, for example in the form of a planar strip, which exhibits relatively low rigidity when arranged on the connecting device. Owing to this lack of inherent rigidity, there is a risk that the connecting foil will be relatively easily displaced when it contacts a contact of the connecting device. This risk is counteracted by way of the idea according to the invention that, with the aid of the guide means, the contact is initially guided contactlessly along the conductor which leads out before it contacts said conductor which leads out in its end position.

In one embodiment of the invention, the connection device comprises at least one contact surface, to which the conductor which leads out from the solar module may be attached. The guide means is configured in such a way that the contact is initially guided at a distance from the contact surface and the conductor which leads out, and presses in the direction of the contact surface when in the end position.

According to a further embodiment of the invention, an arrangement is provided in which the contact encompasses the conductor which leads out in the end position. The guide means is thus configured in such a way that the contact is initially expanded so as to contactlessly bypass the conductor which leads out. For example, the contact is configured as a bent, in particular U-shaped, semi-circular or Ω-shaped contact spring having opposing longitudinal sides which, when in the end position, contacts the conductor which leads out on at least one of its longitudinal sides.

For example, the connection device comprises at least one web, to which the conductor which leads out may be attached, the guide means being arranged at an end of the web facing the contact. By providing such a web, the conductor which leads out can be positioned in a relatively simple manner, the conductor being guided over the web and arranged around the web in such a way that the contact can contact the conductor which leads out on either side.

The guide means may be configured at one end of the web facing the contact as a projection, a swelling or a bulge. A projection of this type or a swelling or bulge of this type may comprise a guide surface, on which the contact initially contactlessly bypasses the conductor which leads out so as to contact said conductor which leads out. For example, the guide means is bulbous.

In a further embodiment of the invention, the connection device comprises a base, by means of which the connection device can be attached and fixed to the solar module. For example, the connection device may be attached by way of its base to an outer face of the solar module and adhesively bonded, for example by way of an adhesive. The connection device preferably comprises at least one web arranged transverse, in particular perpendicular to the base, to which web the conductor which leads out may be attached. It is thus easy to position and contact the conductor which leads out.

In order to securely position the connector housing above the connection device, said connection device comprises, in one embodiment, a positioning means for guiding and positioning the connector housing when said connector housing is arranged above the connecting device and is attached to the solar module.

The current-carrying components in the connector housing may comprise at least one conductor rail having a first contact region for connection to the conductor which leads out from the solar module, and a second contact region for connection to an external electrical conductor, for example of a solar connecting cable. In this case, the contact may be formed in one piece with the conductor rail in the first contact region. The conductor rail is, for example, formed from a punched part and the contact is configured as a contact spring which is punched, in part, from the punched part and is bent.

In order to contact one of the diode components to be connected to the conductor rail, the conductor rail comprises, in one embodiment, a third contact region which, in particular, may also be formed in one piece with the conductor rail. Furthermore, the conductor rail may be configured in such a way that, in the second contact region which is provided for connection to an external electrical conductor, it is formed in one piece with a terminal contact which forms part of a plug connection device. This is placed, for example, on an end face of the connector housing. With the aid of a one-piece terminal contact, the conductor rail may be connected to an external connecting cable via a simple plug connection.

Further advantageous embodiments and developments of the invention are given in the sub-claims.

The invention is explained in more detail below on the basis of the figures shown in the drawings, which show embodiments in relation to this invention.

Figure 2:
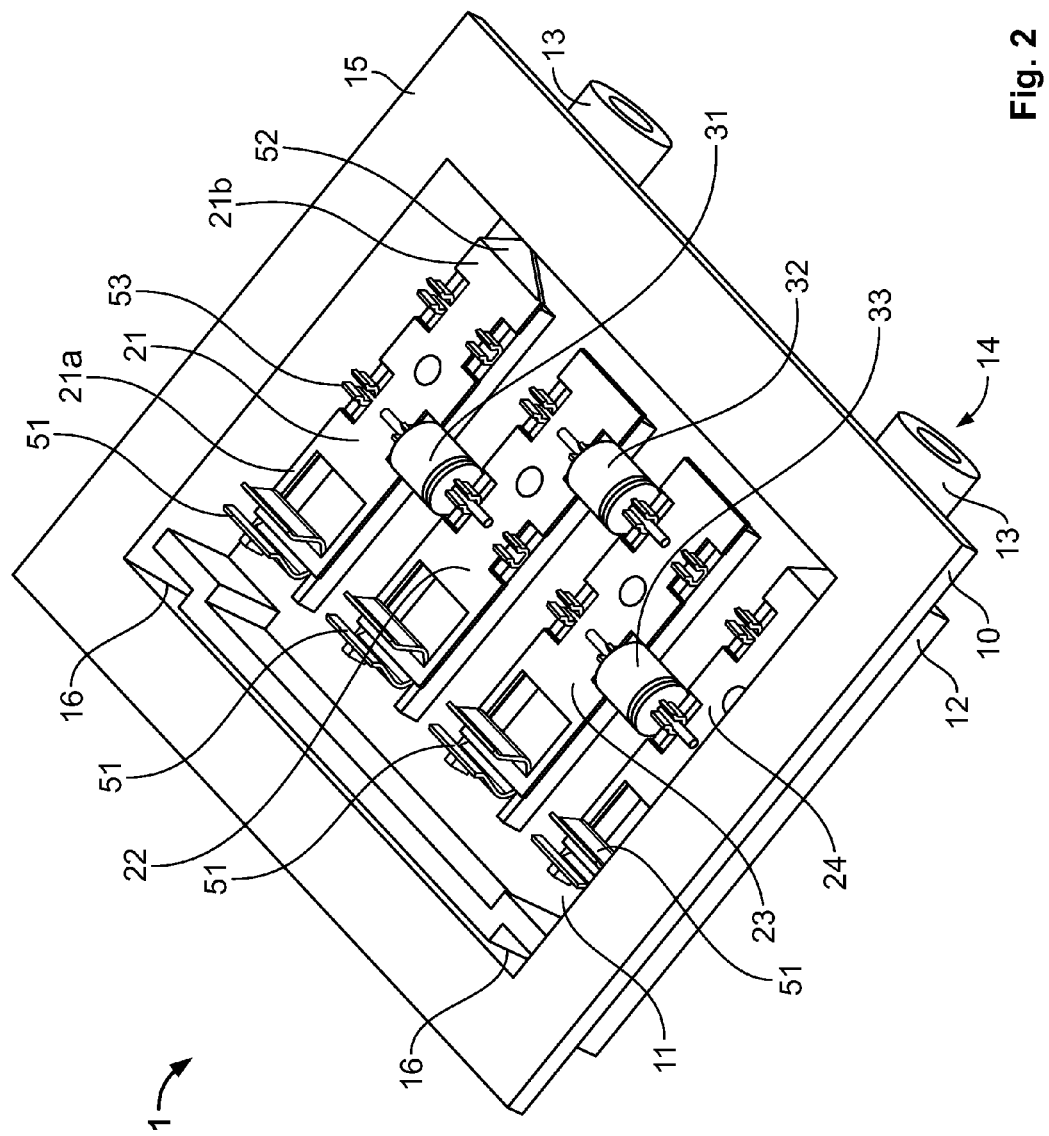

FIG. 1 is a schematic cross-sectional view of an exemplary photovoltaic solar module which is connected to a connecting device according to the invention, FIG. 2 is a schematic perspective view of a lower face of a connector housing having current-carrying components arranged therein in accordance with an embodiment of the invention.

Figure 3:
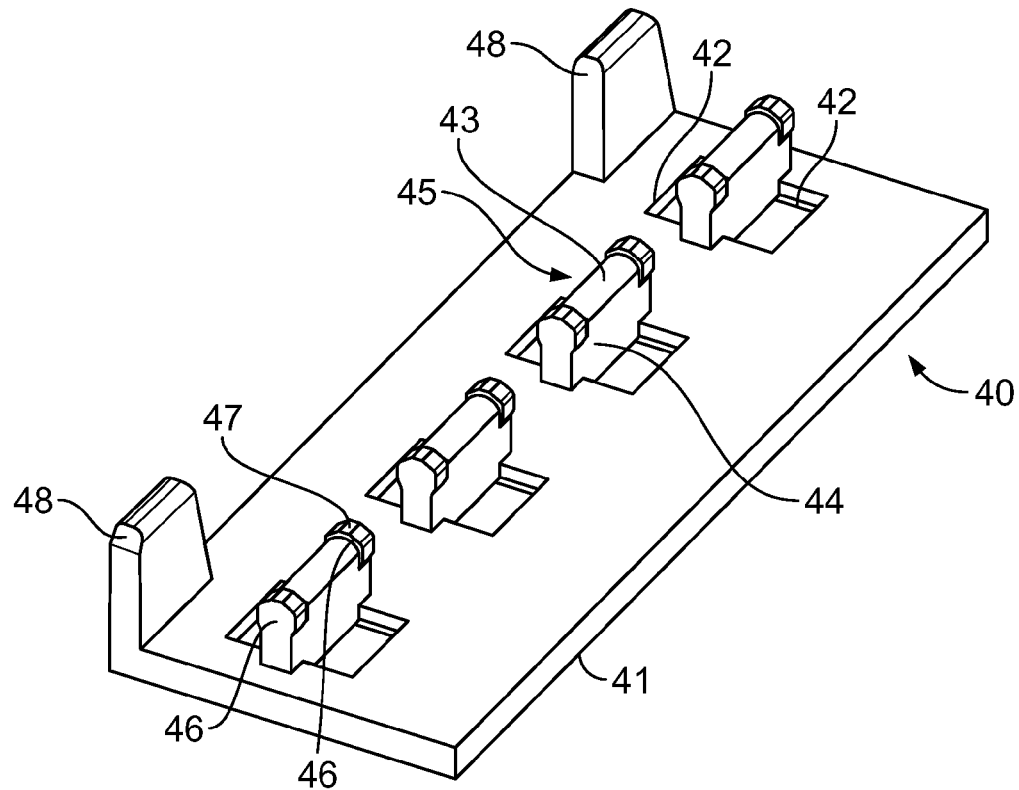
Figure 4:
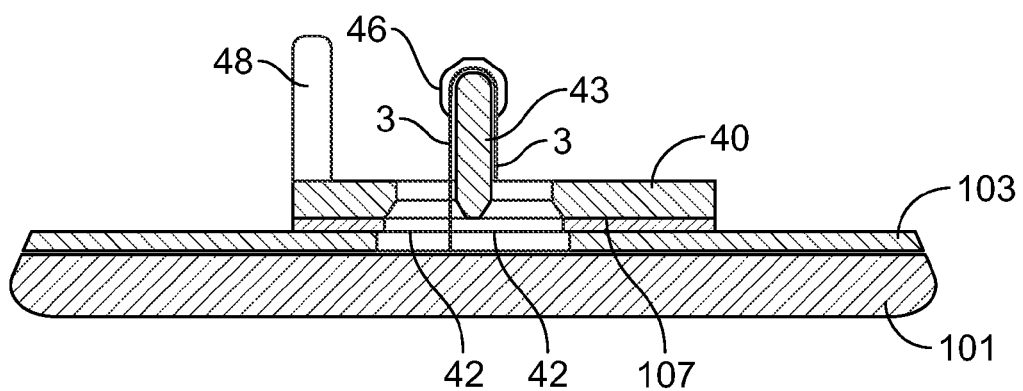

FIG. 3 is a schematic perspective view of an embodiment of a connection device for positioning connecting conductors which lead out from the solar module, which conductors may be arranged inside a connector housing in accordance with FIG. 2, FIG. 4 is a schematic cross-sectional view of a connection device arranged on an exemplary solar module in accordance with FIG. 3, on which a conductor which leads out from the solar module is arranged.

FIG. 1 is a schematic cross-section (not to scale) of a photovoltaic solar module, which is provided with a connecting device in the form of a junction box or connection box. The solar module 100 comprises a layer arrangement with a planar, radiation-side first layer 101, which may be in the form of a glass plate or a foil-type layer. The solar module 100 also comprises a planar second layer 103 which is remote from the radiation side and may also be in the form of a glass plate or a foil-type layer. In this embodiment, the layers 101 and 103 are configured as respective glass plates. Between the two layers 101 and 103, there is at least one solar cell 102 or an arrangement of multiple solar cells 102, which supply electrical energy when they are irradiated with light, owing to a photovoltaic effect. The solar cell(s) 102 is/are connected to an electrical connecting system 104. This is only indicated schematically in FIG. 1 and its purpose is, in particular, to interconnect the solar cell(s) and to connect them to the outside world electrically. The electrical connecting system 104 includes, for example, a copper foil, which on one side is contacted electrically with the back of the solar cell(s) 102, and on the other side merges into one or more electrical conductor(s) 3 of the solar module or is connected to at least one electrical conductor 3 of the solar module, said electrical conductor being, for example, in the form of a connecting foil or a connecting ribbon and being led out from the solar module. Via one or more film conductor(s) 3 of this type, the electrical connecting system 104 of the solar module 100 can be connected to an external connecting line 2, for example in the form of a solar connecting cable.

As is also shown in FIG. 1, a connecting device 1 (as described in greater detail below) is fixed to the back of the layer 103, which forms an outer face of the solar module, for example by being adhesively bonded by way of an adhesive 107. Furthermore, the layer 103 comprises a throughhole 105, through which the electrical conductor 3, which is in the form of a film conductor for example, may be guided towards the connecting device 1.

FIG. 2 shows an embodiment of a connector housing 10 such as may be used for a connecting device 1, having exemplary current-carrying components arranged therein. A further component of a connecting device of this type in the form of a connection device for positioning conductors which lead out from the solar module is explained in greater detail with reference to an embodiment in FIGS. 3 and 4. The composition and mode of action of the individual components shown in FIGS. 2 to 4 are made clear in particular by viewing the combination of FIGS. 2 to 4, and will be described in greater detail hereinafter.

The connecting device 1, as shown schematically in FIG. 1, is primarily formed by two main components in this embodiment, namely by a connector housing 10 having current-carrying components arranged therein and a connecting device 40, which is arranged inside the connector housing 10 and positions conductors 3 which lead out from the solar module. The connecting device 40 according to this embodiment is plate-like and comprises on its lower face a base 41, to which the connection device 40 may be attached and fixed at an outer face of the solar module 100. For example, the connection device 40 may be fixed at its base 41 to the outer layer 103 of the solar module 100 by way of an adhesive 107, as shown in FIG. 4. The connection device 40 also comprises a plurality of webs 43 arranged transverse, in particular perpendicular to the base 41, to which webs a respective conductor 3 which leads out may be attached. In this regard, it is also possible in principle for fewer or only one individual, continuous web to be provided, to which the conductor 3 which leads out may be attached. A plurality of guide means 46 may be provided on a continuous web of this type at the corresponding positions for the respective conductors 3 which lead out.

As shown in greater detail in FIG. 4, a conductor 3 which leads out is led out from the solar module in an approximately vertical direction and arranged around the web 43. A through-hole 42 is provided on either side of the web 43, through which hole the conductor 3 can be led out from the solar module.

As shown in greater detail in FIG. 3, each web 43 comprises a first (front) contact surface 44 and a second (rear) contact surface 45, which may be planar. As is made clear by viewing FIG. 4, the conductor 3 which leads out surrounds the web 43 and is attached to both the contact surface 44 and the contact surface 45 in such a way that the conductor 3 is led vertically in a U-shape from the solar module and can be contacted. In this regard it is also possible for the conductor 3 to be attached merely on one side to only one of the contact surfaces 44, 45 of the web 43 and thus to be contacted on only one side.

A plurality of conductor rails 21 to 24 are provided in the connector housing 10 according to FIG. 2, the configuration and arrangement of said conductor rails only being shown in an exemplary manner and varying in accordance with requirements. In particular, depending on requirements, the number of conductor rails used may vary. In a first contact region, denoted for example with the reference numeral 21a in FIG. 2 with regard to the conductor rail 21, the respective conductor rails are connected to a corresponding conductor 3 which leads out from the solar module. In a second contact region, denoted for example with the reference numeral 21b with regard to the conductor rail 21, the two outer conductor rails 21 and 24 are connected to an external electrical conductor, for example an electrical conductor of one or more connecting cables 2, as shown in FIG. 1. By way of the conductor ducts 13 arranged on the connector housing 10, the two outer conductor rails 21 and 24 are connected to respective connecting cables 2. The two conductor rails 22 and 23 arranged in the middle are connected in their first contact regions merely to a corresponding conductor 3 which leads out from the connecting system of the solar module.

In this regard, it is also possible in principle for the conductor rails 21 and 24 as well as the connecting ducts 13 to be arranged in the middle of the connector housing 10, whilst the conductor rails 22 and 23 may be arranged in the right-hand and left-hand edge regions of the connector housing 10. In another embodiment it is possible, if and as required, for only two of the conductor rails 21 to 24 to be provided in the connector housing 10. The conductor rails 21 to 24 are, for example, locked or otherwise fixed to a corresponding locking element in the connector housing 10.

A respective contact 51 provided for contacting a conductor 3 which leads out, which contact is in the form of a contact spring for example, is connected to one of the conductor rails 21 to 24. In the present embodiment, the respective contact 51 is formed in one piece with the corresponding conductor rail 21 to 24. In order to produce a conductor rail, a punched part may be used, from which the contact 51 may be punched in part and bent. A contact spring 51, for example in the form of an Ω-spring, may thus be formed with opposing longitudinal sides which are provided for contacting a conductor 3 which leads out on either side, as described with reference to FIG. 4. In particular, the longitudinal sides of the contact spring 51 are formed in such a way that they exert a contacting pressure in the direction of the contact surfaces 44 and 45 of a web 43 so as to press the corresponding conductor 3 which leads out against the web 43 and thus produce contact between the contact spring 51 and conductor 3. In this regard another shape of the contact spring 51 is also conceivable, for example it may be U-shaped, semi-circular or the like, this shape being suitable for encompassing and contacting the respective conductor 3 which leads out on either side.

In addition to the aforementioned contact regions for contacting a conductor 3 which leads out on the one hand and a connecting cable 2 on the other hand, the conductor rails 21 to 24 may comprise a respective further contact region 53, which is provided for contacting a diode component. The diode components 31 to 33 shown in FIG. 2, which act as so-called bypass diodes, comprise respective diode connecting wires which are each attached to one of the conductor rails in the contact region 53. The diode component 31 thus connects the conductor rails 21 and 22 to one another, the diode component 32 connects the conductor rails 22 and 23 to one another and the diode component 33 connects the conductor rails 23 and 24 to one another. The diode components 31 to 33 are configured as annular diodes in the present embodiment, the respective diode body being arranged between each of the interconnected conductor rails and in each case extending in a space-saving manner below and above the conductor rails. The conductor rails and diodes can thus be arranged in a space-saving manner. The contact regions 53 for contacting the diode components may also be formed in one piece with the respective conductor rail.

Respective plug connection devices 14 may be provided at the conductor ducts 13 in a side wall 12 of the connector housing 10 in order to connect the conductor rails 21 and 24 to respective cable connectors of a connecting cable 2. In accordance with this embodiment, the conductor rails 21 and 24 are provided in one piece with a respective terminal contact 52 which, for example, may be configured as a pin contact or a socket contact depending on the configuration of the plug connection device 14. Said terminal contact 52, which forms part of the respective plug connection device, connects the conductor rail 21 or 24 to an external electrical conductor of a connecting cable 2.

The connector housing 10 comprises a peripheral edge having a sealing surface 15 which is arranged on top of the solar module 100 and is connected to the solar module in a tight manner. The sealing surface 15 is thus provided with an adhesive 107 (cf. FIG. 1) and is adhesively bonded to an outer face of the solar module in such a way that the housing opening 11 and the interior of the connector housing 10 are protected against outside environmental effects.

In order to produce a connecting device 1 according to the invention, the connection device 40 is first adhesively bonded and fixed to one of the outer faces of the solar module 100 via its base 41. In the embodiment shown, four electrical conductors 3 which lead out and are in the form of connecting foils are arranged around respective webs 43, as already described above with reference to FIGS. 3 and 4. In order for the connector housing 10 to subsequently be placed and positioned above the connection device 40, two positioning means 48 in the form of guide webs are provided on said connection device and guide and position the connector housing 10 when it is arranged above the connection device 40 and is attached to the solar module 100. Whilst the connector housing 10 is being placed and arranged above the connecting device 40, the contact springs 51 are guided over the respective webs 43 so as to contact the respective electrical conductor 3.

When the connector housing 10 is moved so as to be placed above the connection device 40, the contact springs 51 are thus moved, in part, along the respective conductor 3 which leads out. In order to produce reliable contact between contact springs 51 and conductors 3 in an end position, the longitudinal sides of the respective contact spring 51 exert a specific spring force in the direction of the contact surfaces 44 and 45 of the webs 43 so as to press the conductor 3 which leads out against the web 43 in the end position and to produce reliable contact. Owing to the inwardly directed spring force of the contact springs 51, when the connector housing 10 is pulled over the connection device 40 it is possible that if no specific precautions are taken, the electrical conductors 3 placed over the webs 43 will be displaced until the respective contact spring 51 is fixed in its end position.

In order to avoid this, it is provided in accordance with the invention for the respective contact spring 51 to first be guided contactlessly along the corresponding conductor 3 so as to contact said conductor, in such a way that the electrical conductor 3 cannot be displaced while the connector housing 10 is being arranged in place. This may be ensured by way of a suitable guide means 46 on the webs 43, which ensures that the longitudinal sides of the contact spring 51 are first guided at a distance from the contact surfaces 44 and 45 and at a distance from the respective conductor 3 which leads out, so the conductor 3 cannot be displaced. This effect may, for example, be achieved in that the guide means 46 expand each of the contact springs 51 so they can contactlessly bypass the conductors 3 which lead out.

Since there is a particular risk of displacing a conductor 3 when the contact spring 51 approaches the end face of a web 43, the respective guide means 46 is, in particular, arranged at the end of the web 43 facing the contact spring 51. The guide means may be configured, for example, as a projection, a swelling or a bulge which can accordingly expand the respective contact spring 51 so as to contactlessly bypass the conductor 3. In this embodiment, the guide means 46 are configured as bulbous bulges 46 which each comprise a guide surface 47 which expands the respective contact spring 51 and allows it to contactlessly bypass the conductor 3 which leads out before the contact spring 51 contacts the conductor 3 which leads out in the end position. The conductor 3 which leads out is thus arranged between two guide means 46 of a web 43. In order for the conductor 3 to be bypassed, the contact springs 51 are of a width which approximately covers the distance between two adjacent guide means 46 comprising an interposed conductor 3 as well as the guide means 46 itself, this embodiment thus corresponding approximately to the width of a web 43 in such a way that the guide means 46 arranged on either side of a conductor 3 are contacted by the longitudinal sides of the contact spring 51, in such a way that said contact spring may be expanded by the bulges or swellings 46. Since the conductor 3 is arranged between the bulges 46, said conductor is initially not contacted by the longitudinal sides of the contact spring 51 when the connector housing 10 is pulled over, said conductor also not being displaced owing to the movement of the connector housing 10 when it is arranged in place.

Once the longitudinal sides of the contact spring 51 have passed the end face of the corresponding web 43 in the expanded position, the bulges 46 narrow in the direction of the contact surfaces 44 and 45 in such a way that the longitudinal sides of the contact spring 51 press the conductor 3 on either side against the web 43. In this position, however, the contact spring 51 can no longer displace the conductor 3 since the pressure is exerted substantially uniformly below the end face of the web 43 and onto either side of the conductor 3 in such a way that, in principle, it can no longer be displaced unilaterally.

In order to precisely position the connector housing 10, the guide webs 48 engage with a respective guide groove 16 in the connector housing 10 in such a way as to ensure that the contact springs 51 are oriented towards the conductors 3 which lead out in the correct position. Owing to the fact that the sealing surface 15 is arranged on and adhesively bonded to the solar module, the components provided in the housing opening 11 in the connector housing 10 are protected against environmental effects and, simultaneously, the contact springs 51 reliably contact the conductors 3 which lead out.

By separating the connecting device 1 into two main components (connector housing with current-carrying components arranged therein on the one hand and connecting device for positioning the conductor leading out from the solar module on the other hand), the electrical connection region can be accessed extremely easily. In particular, by providing the connection device 40, the connecting foils which lead out can be arranged very easily at the respective webs since the connection device 40 is extremely accessible. The connector housing 10 may then be moved in order to be arranged in place and fixed in position in a tight, sealing manner, thus producing the contact. By opening the contact springs 51 beforehand when positioning the connector housing, the connecting foils arranged on the webs are not loaded with force exerted by the contact springs. Instead, the contact springs only contact the corresponding connecting foils which lead out once the connector housing has been positioned, any displacement of the connecting foils being effectively prevented.

The invention claimed is:
1. Connecting device for connection to an electrical connecting system of a solar module, comprising:
a connector housing for arranging on an outer face of the solar module, and
current-carrying components arranged in the connector housing, which components comprise at least one contact for connection to a conductor of the electrical connection system of the solar module, which conductor leads out from the solar module,
a connection device, which may be arranged inside the connector housing, for positioning the conductor which leads out from the solar module, it being possible for the connection device and the contact to be arranged relative to one another in such a way that the contact is moved, at least in part, along the conductor which leads out so as to contact said conductor which leads out, characterised in that the connection device comprises at least one guide means which is configured in such a way that the contact is initially guided contactlessly along the conductor which leads out, so as to contact said conductor which leads out, and contacts the conductor which leads out when in an end position.

2. Connecting device according to claim 1, wherein the connection device comprises at least one contact surface, to which the conductor which leads out from the solar module may be attached, and the guide means is configured in such a way that the contact is initially guided at a distance from the contact surface and the conductor which leads out, and presses in the direction of the contact surface when in the end position.

3. Connecting device according to claim 1, wherein the contact encompasses the conductor which leads out in the end position and the guide means is configured in such a way that the contact is initially expanded so as to contactlessly bypass the conductor which leads out.

4. Connecting device according to claim 1, wherein the connection device comprises at least one web, to which the conductor which leads out may be attached, and the guide means is arranged at an end of the web facing the contact.

5. Connecting device according to claim 4, wherein the guide means is bulbous.

6. Connecting device according to claim 1, wherein the guide means is configured at the connection device as a projection, a swelling or a bulge, which has a guide surface on which the contact initially contactlessly bypasses the conductor which leads out so as to contact said conductor which leads out.

7. Connecting device according to claim 1, wherein the connection device comprises at least one web, to which the conductor which leads out may be attached and the contact presses the conductor which leads out against the web when in the end position.

8. Connecting device according to claim 1, wherein the contact is configured as a bent, in particular U-shaped, semi-circular or Ω-shaped contact spring having opposing longitudinal sides which, when in the end position, contacts the conductor which leads out on at least one of its longitudinal sides.

9. Connecting device according to claim 1, wherein the connection device comprises a base, by means of which the connection device can be attached and fixed to the solar module, and comprises at least one web arranged transverse, in particular perpendicular to the base, to which web the conductor which leads out may be attached.

10. Connecting device according to claim 1, wherein the connection device comprises at least one positioning means for guiding and positioning the connector housing when said connector housing is arranged above the connecting device and is attached to the solar module.

11. Connecting device according to claim 1, wherein the current-carrying components comprise at least one conductor rail having a first contact region for connection to the conductor which leads out from the solar module, and a second contact region for connection to an external electrical conductor, the contact being formed in one piece with the conductor rail in the first contact region.

12. Connecting device according to claim 11, wherein the conductor rail is formed from a punched part and the contact is configured as a contact spring which is punched, in part, from the punched part and is bent.

13. Connecting device according to claim 11, wherein the conductor rail comprises a third contact region for contacting a diode component, the third contact region being formed, in particular, in one piece with the conductor rail.

14. Connecting device according to claim 11, wherein the conductor rail is formed in the second contact region in one piece with a terminal contact as part of a plug connection device so as to connect the conductor rails to the external electrical conductor.

15. Solar module with a connecting device according to claim 1, wherein the connection device is attached and fixed to the solar module and the connector housing is arranged above the connection device in such a way that the contact contacts the conductor which leads out.

* * * * *